United States Patent [19]

Noguchi et al.

[11] 4,098,246
[45] Jul. 4, 1978

[54] INTERNAL COMBUSTION ENGINE WITH AN AUXILIARY COMBUSTION CHAMBER

[75] Inventors: Masaaki Noguchi, Nagoya; Shougo Sanda, Numazu; Norihiko Nakamura, Mishima; Takashi Kato, Susono, all of Japan

[73] Assignee: Toyota Jidosha Kogyo Kabushiki Kaisha, Toyota, Japan

[21] Appl. No.: 749,054

[22] Filed: Dec. 9, 1976

[30] Foreign Application Priority Data

Oct. 1, 1976 [JP] Japan ............................. 51-117108

[51] Int. Cl.$^2$ ............................................. F02R 25/06
[52] U.S. Cl. ........................... 123/119 A; 123/32 L; 123/32 SP; 123/30 D; 123/191 S; 123/191 SP
[58] Field of Search .......... 123/119 A, 191 S, 191 SP, 123/32 L, 32 SP, 30 D, 32 ST

[56] References Cited

U.S. PATENT DOCUMENTS

| | | | |
|---|---|---|---|
| 3,875,909 | 4/1975 | May | 123/191 S |
| 3,896,777 | 7/1975 | Masaki et al. | 123/119 A |
| 3,968,782 | 7/1976 | Noguchi et al. | 123/191 SP |
| 4,020,817 | 5/1977 | Noguchi et al. | 123/191 SP |
| 4,038,959 | 8/1977 | Takizawa | 123/191 S |

FOREIGN PATENT DOCUMENTS

| | | | |
|---|---|---|---|
| 2,543,401 | 1/1977 | Fed. Rep. of Germany | 123/191 S |
| 2,331,560 | 1/1977 | Fed. Rep. of Germany | 123/191 S |

*Primary Examiner*—Wendell E. Burns
*Attorney, Agent, or Firm*—Stevens, Davis, Miller & Mosher

[57] ABSTRACT

Disclosed is an internal combustion engine with an auxiliary combustion chamber having an exhaust gas recirculating device for recirculating the exhaust gas from the exhaust system into the intake system. The auxiliary combustion chamber is connected only to the main combustion chamber via at least two connecting passages. The connecting passages are arranged so that the combustible mixture introduced into the auxiliary combustion chamber from the main combustion chamber via one of said connecting passages strengthens the swirl motion of the mixture created by the combustible mixture introduced into the auxiliary combustion chamber from the main combustion chamber via the other connecting passage.

19 Claims, 9 Drawing Figures

INTERNAL COMBUSTION ENGINE WITH AN AUXILIARY COMBUSTION CHAMBER

DESCRIPTION OF THE INVENTION

The present invention relates to an internal combustion engine with an auxiliary combustion chamber, which is provided with an exhaust gas recirculating system.

As a method for reducing the amount of the harmful $NO_x$ components in the exhaust gas, there is known a method for recirculating the exhaust gas into the intake system of the engine. In order to effectively reduce the amount of $NO_x$, it is preferable that a large amount of the exhaust gas be recirculated into the intake system. In this case, however, since the recirculated exhaust gas (hereinafter referred to as EGR gas) is not uniformly mixed with an air-fuel mixture in the combustion chamber, the combustion becomes unstable, thus causing a problem in that the drivability of the vehicle is decreased and the amount of harmful HC components produced is increased In order to improve the drivability of a vehicle, there has been proposed a method of using a rich air-fuel mixture. However, this method has disadvantages in that the fuel consumption is increased and, particularly when the engine is provided with a catalytic converter for purifying the exhaust gas, the temperature of the catalyzer is increased, thus causing a reduction of the durability of the catalytic converter.

In addition, as a method for obtaining stable combustion without increasing the fuel consumption, there has been proposed a method in which a plurality of spark plugs are disposed in the combustion chamber and mixture is ignited simultaneously at the separate points in the combustion chamber, thereby quickening the combustion time. However, this method has disadvantages in such the construction of the engine becomes complicated, whereby the manufacturing cost of the engine is increased.

Furthermore, as a method for obtaining stable combustion without increasing the fuel consumption, there has been proposed an internal combustion engine with an auxiliary combustion chamber, in which the combustion chamber comprises a main combustion chamber and an auxiliary combustion chamber. In this engine, an air-fuel mixture of an approximately stoichiometric air-fuel ratio containing a large amount of the EGR gas therein, or a lean air-fuel mixture containing a large amount of the EGR gas therein, is introduced into the main combustion chamber at the time of the intake stroke, and; then, the mixture is forced into the auxiliary combustion chamber at the time of the compression stroke. Subsequently, the mixture introduced into the auxiliary combustion chamber is ignited and, then, the mixture in the main combustion chamber is burned by a jet of flame injected from the auxiliary combustion chamber. In an internal combustion engine of this type, the turbulent burning of the mixture occurs in the main combustion chamber, due to the mixing operation of the air-fuel mixture and the EGR gas caused by the jet of flame, thus obtaining a stable combustion superior to that in an engine without an auxiliary combustion chamber. However, in a majority of conventional engines with auxiliary combustion chambers, the engine is provided with a single flame injecting hole, that is, a single connecting passage communicating the auxiliary combustion chamber with the main combustion chamber, and this connecting passage is directed to the central portion of the main combustion chamber. Consequently, a good combustion is effected in the central portion of the main combustion chamber where the jet of flame is able to reach. However, since a large amount of the EGR gas is contained in the air-fuel mixture, the propagating speed of the flame is slow. Thus, a good combustion cannot be effected in the peripheral portion of the main combustion chamber where the jet of flame torch cannot reach. As a result of this, there are the disadvantages that the amount of harmful HC components produced is increased and stable combustion cannot be obtained.

In order to inject the jet of flame into the entire space of the main combustion chamber, a method of providing a plurality of the connecting passages is easily conceived. However, if merely a plurality of the connecting passages are provided, the jet of flame is weakened, whereby the combustion becomes unstable. In addition, when a plurality of connecting passages are provided, if the connecting passages are arranged so that the mixture stream introduced into the auxiliary combustion chamber from one of the connecting passages comes into violent contact with the mixture stream introduced into the auxiliary combustion chamber from another connecting passage, thereby reducing the velocity of the mixture streams, turbulence is created in the auxiliary combustion chamber when the engine rotates at a high speed. On the other hand, with the same arrangement, turbulence is not created in the auxiliary combustion chamber when the engine rotates at a low speed or when the igniting operation is effected at a crank angle near the top dead center because the velocity of the mixture stream in the auxiliary combustion chamber is very low. As a result of this, the combustion in the auxiliary combustion chamber cannot be sufficiently effected and the jet of flame is weakened. Therefore, the combustion in the main combustion chamber becomes unstable and the amount of harmful HC components produced is increased.

An object of the present invention is to provide an internal combustion engine with an auxiliary combustion chamber capable of stabilizing the combustion in the main combustion chamber and reducing the amount of harmful HC components produce in such a manner that a plurality of the connecting passages are arranged so that each of the mixture streams introduced into the auxiliary combustion chamber via the respective connecting passages strengthens the swirl motion of the mixture created by said mixture streams, thereby a strong and stable jet of flame can always be injected into the main combustion chamber from the auxiliary combustion chamber.

According to the present invention, there is provided an internal combustion engine having an intake system, an exhaust system, and an exhaust gas recirculating system for recirculating the exhaust gas from the exhaust system into the intake system, comprising:

a cylinder comprising a cylinder block and a cylinder head;

a piston reciprocally movable in said cylinder;

a main combustion chamber formed in said cylinder between said cylinder head and said piston, said cylinder head having therein a bore which has an inner wall defining an auxiliary combustion chamber;

a first connecting passage communicating said auxiliary combustion chamber with said main combustion chamber and opening into said auxiliary combustion chamber tangentially to the inner wall of said auxiliary combustion chamber for generating a swirl motion of a combustible mixture containing the recirculated exhaust gas therein in said auxiliary combustion chamber;

a second connecting passage communicating said auxiliary combustion chamber with said main combustion chamber and opening into the auxiliary combustion chamber towards said inner wall of the auxiliary combustion chamber to which said first connecting passage opens tangentially for strengthening said swirl motion, and;

a spark plug having a spark gap located in an auxiliary chamber region consisting of said auxiliary combustion chamber and said connecting passages.

The above-mentioned object of the present invention may be more fully understood from the following description of preferred embodiments of the invention, together with the accompanying drawings.

DESCRIPTION OF PREFERRED EMBODIMENTS

Figure 1:
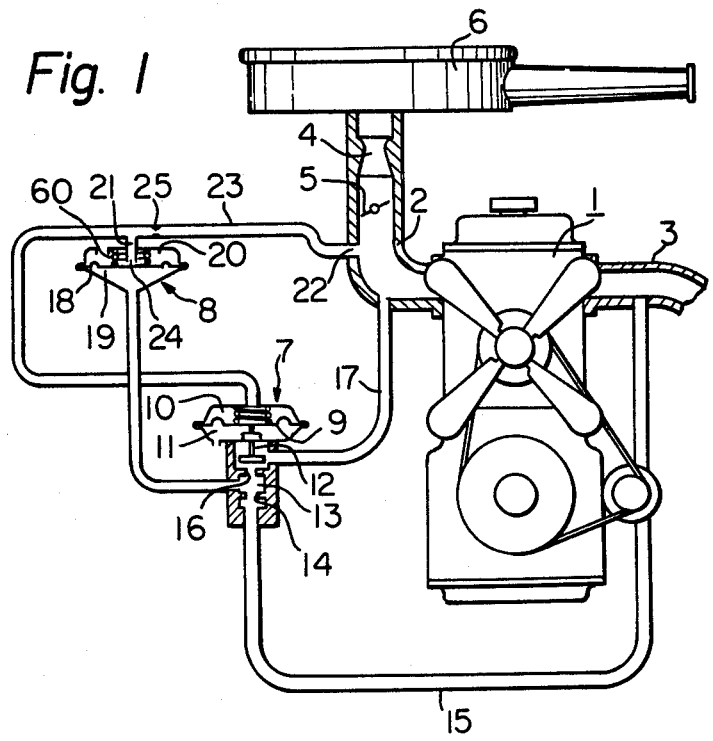
FIG. 1 is a schematical view of an internal combustion engine with an auxiliary combustion chamber according to the present invention.

Referring to FIG. 1, which shows a schematical view of an internal combustion engine with an auxiliary combustion chamber, 1 designates an engine body, 2 an intake manifold, 3 an exhaust manifold, 4 a carburetor, 5 a throttle valve of the carburetor 4, and 6 an air cleaner. An EGR device will be described first with reference to FIG. 1.

The EGR device comprises an EGR valve 7 and a pressure regulating valve 8. The EGR valve 7 includes a vacuum chamber 10 and an atmospheric pressure chamber 11 which are separated by a diaphragm 9. An opening control valve 12 is connected to the diaphragm 9. The EGR valve 7 further includes a constant pressure chamber 13. This constant pressure chamber 13 is connected to the exhaust manifold 3 via a restricted opening 14 and an EGR gas conduit 15, and also connected to the intake manifold 2 via an EGR gas conduit 17 and a restricted opening 16. The opening area of the restricted opening 16 is controlled by the opening control valve 12. The pressure regulating valve 8 includes a pressure regulating chamber 19 and an atmospheric pressure chamber 20 which are separated by a diaphragm 18. The valve 8 further includes an air bleed pipe 21 stationarily arranged in the atmospheric pressure chamber 20. One end of the air bleed pipe 21 is connected to a vacuum conduit 23 which connects the vacuum chamber 10 of the EGR valve 7 with a vacuum port 22 opening into the intake manifold 2 at a position located downstream of the throttle valve 5. The other end of the air bleed pipe 21 forms an air bleed nozzle 24 which is arranged so as to face the diaphragm 18. A restricted opening 25 is disposed in the vacuum conduit 23 between the vacuum port 22 and the air bleed pipe 21. The pressure regulating chamber 19 of the pressure regulating valve 8 is connected to the constant pressure chamber 13 of the EGR valve 7.

When the pressure of the exhaust gas in the constant pressure chamber 13 is slightly increased above the atmospheric pressure, the diaphragm 18 of the pressure regulating valve 8 moves upwards against the spring force of a compression spring 60 to throttle the air bleed nozzle 24. Consequently, the vacuum level in the vacuum chamber 10 is increased, whereby the opening control valve 12 moves upwards to increase the opening area of the restricted opening 16. This results in the pressure of the exhaust gas in the constant pressure chamber 13 being decreased. Subsequently, when the pressure of the exhaust gas in the constant pressure chamber 13 is slightly decreased below the atmospheric pressure, the diaphragm 18 of the pressure regulating valve 8 moves downwards to increase an amount of the bleeding air in the air bleed nozzle 24. Consequently, the vacuum level in the vacuum chamber 10 is decreased, whereby the opening control valve 12 moves downwards to reduce the opening area of the restricted opening 16. This results in the pressure of the exhaust gas in the constant pressure chamber 13 being increased. By controlling the pressure in the constant pressure chamber 13 as is aforementioned, the pressure of the exhaust gas in the constant pressure chamber 13 is always maintained equal to approximately atmospheric pressure.

Assuming that the gauge pressure of the exhaust gas in the exhaust manifold 3 is $P_E$, and the gauge pressure of the exhaust gas in the constant pressure chamber 13 is $P_o$, and also assuming that the flow rate of the exhaust gas introduced into the constant pressure chamber 13 from the exhaust manifold 3 via the restricted opening 14 is Q, Q, $P_E$ and $P_o$ have the following relationship.

$$Q \, \alpha \, \sqrt{P_E - P_o}$$

However, since $P_o$ is nearly equal to zero, the above relationship is as follows.

$$Q \, \alpha \, \sqrt{P_E}$$

Further, since the amount of air $Q_a$ introduced into the cylinder of the engine and the gauge pressure $P_E$ have the relationship $P_E \, \alpha \, Q_a^2$ the relationship between the flow rate of the EGR gas Q and the amount of the introduced air $Q_a$ is as follows.

$$Q \, \alpha \, Q_a$$

Consequently, the amount of the EGR gas Q recirculated into the intake manifold 2 is proportional to an amount of the introduced air $Q_a$. Thus, in the EGR system shown in FIG. 1, the EGR rate (the rate of the amount of the EGR gas to the amount of the mixture introduced into the cylinder of the engine) is always maintained at a constant value, thereby effectively reducing the amount of harmful NO$_x$ components produced in the exhaust gas.

Figure 2:
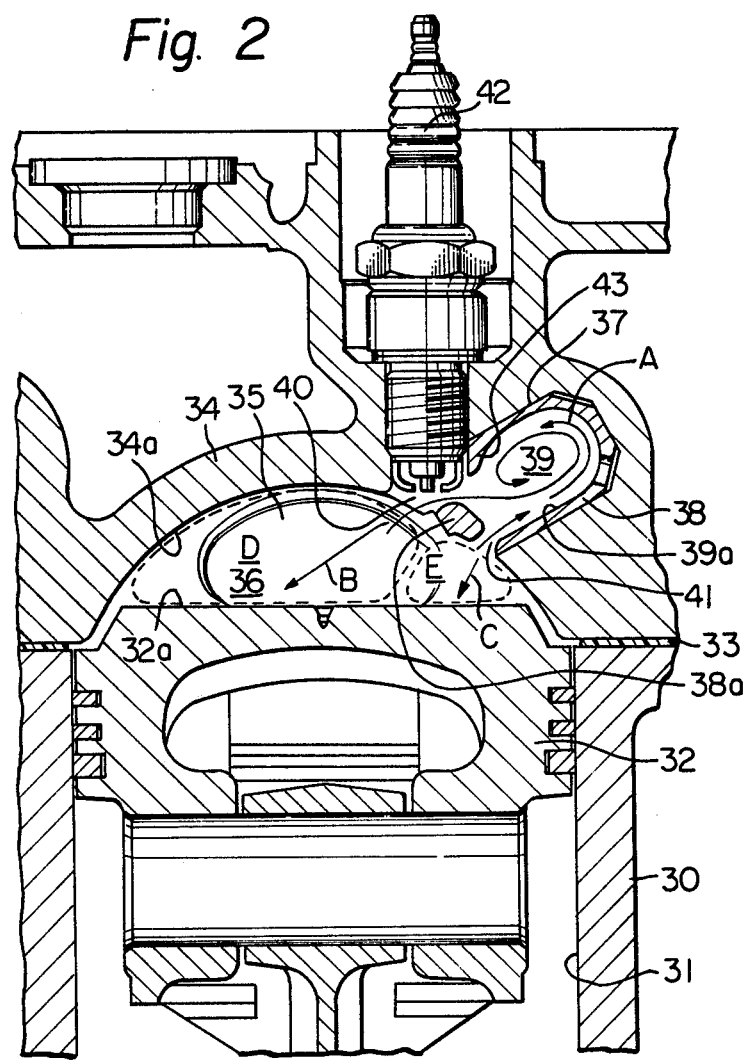
FIG. 2 is a cross-sectional side view of the engine body in FIG. 1.

The construction of the engine body will now be described with reference to FIG. 2. In FIG. 2, an internal combustion engine comprises a cylinder block 30, a piston 32 reciprocally movalbe in the cylinder 31 formed in the cylinder block 30, a cylinder head 34 fixed onto the cylinder block 30 via a gasket 33, an intake valve 35, an exhaust valve (not shown), a main combustion chamber 36 formed between the inner wall 34a of the cylinder head 34 and the top surface 32a of the piston 32, and an auxiliary chamber component 38 press-fitted into a recess 37 formed in the cylinder head 34. An auxiliary combustion chamber 39 and two connecting passages 40 and 41, each communicating the auxiliary combustion chamber 39 with the main combustion chamber 36, are formed in the auxiliary chamber component 38. In the embodiment shown in FIG. 2, the spark gap of the spark plug 42 is located in the connecting passage 40. However, the spark plug 42 may be arranged so that the spark gap thereof is located at any other place in the auxiliary chamber region consisting of the auxiliary combustion chamber 39 and the connecting passages 40 and 41.

At the time of the intake stroke, an air-fuel mixture containing the EGR gas therein is introduced into the main combustion chamber 36 via the intake valve 35. Subsequently, the air-fuel mixture is forced into the auxiliary combustion chamber 39 via the connecting passages 40, 41 at the time of the compression stroke. The connecting passages 40, 41 are arranged so that the mixture introduced into the auxiliary combustion chamber 39 generates a swirl motion as shown by the arrow A in the auxiliary combustion chamber 39. That is, the connecting passages 40, 41 are arranged so that the mixture entering into the auxiliary combustion chamber 39 from the connecting passage 41 strengthens the swirl motion created by the mixture entering into the auxiliary combustion chamber 39 from the connecting passage 40. In the embodiment shown in FIG. 2, the connecting passage 41 is arranged so that the mixture introduced into the auxiliary combustion chamber 39 form the connecting passage 41 flows along the inner wall 39a of the auxility combution chamber 39 located opposite the spark plug 42 with respect to the central axis of the auxiliary chamber component 38. The connecting passage 40 opens into the auxiliary combustion chamber 39 towards the inner wall 39a so that the mixture introduced into the auxiliary combustion chamber 39 from the connecting passage 40 comes into smooth contact with the inner wall 39a and, then, swirls in the auxiliary combustion chamber 39. A dam 43 is formed on the inner wall of the auxiliary combustion chamber 39 in the vicinity of the spark gap of the spark plug 42. The dam 43 serves to direct the mixture flowing in the connecting passage 40 to the inner wall 39a positioned opposite the spark plug 42 with respect to the central axis of the auxiliary chamber component 38, and guide the swirl of the mixture created in the auxiliary combustion chamber 39. In addition, the dam 43 also serves to prevent the combustion gas, which has a high temperature, from directly impinging against the electrode of the spark plug 42 when the mixture in the auxiliary combustion chamber 39 ignited by the spark plug 42 is injected into the main combustion chamber 36, thereby preventing the melting of the electrode of the sprak plug 42.

The approximate velocity U of the mixture entering into the auxiliary combustion chamber 39 at the time of the compression stroke is given by the following equation.

$$U = U_p(V_p/C \cdot F_t) \cdot (A/V)$$

where $U_p$ = the velocity of the piston,
C = the flow coefficient of the connecting passage,
$F_t$ = the total cross-sectional area of the connecting passages,
$V_p$ = the volume of the auxiliary combustion chamber,
V = the total volume, which is, the sum of the volume of the main combustion chamber and the volume of the auxiliary combustion chamber at a given crank angle at the time of the compression stroke,
A = the cross-sectional area of the cylinder.

Figure 3:
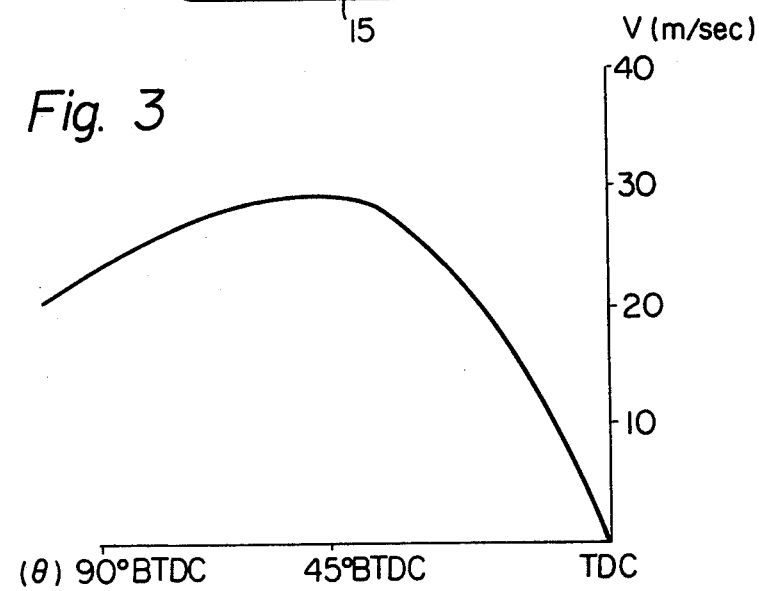
FIG. 3 is a graph showing the relationship between the crank angle ($\theta$) and the velocity U(m/sec) of the mixture flowing in the connecting passages.

FIG. 3 shows an example of the relationship between the velocity U and the crank angle $\theta$. As will be understood from the above equation and FIG. 3, the velocity U is considerably reduced when the engine is operating at a low speed, that is, when the velocity $U_p$ of the piston is slow, or when the piston reaches a crank angle near the top dead center. However, even if the velocity U of the mixture flowing in the connecting passages 40, 41 is slow, a relatively strong swirl and turbulence can be created in the auxiliary combustion chamber 39 by positioning the connecting passages 40, 41 as shown in FIG. 2. After the piston reaches a crank angle near to the top dead center, where the velocity U of the mixture flowing in the connecting passages 40, 41 is considerably reduced, the mixture in the auxiliary combustion chamber 39 continues to swirl. Consequently, even if the igniting operation is effected when the piston reaches a crank angle near to the top dead center, and the mixture contains a large amount of the EGR gas therein, the mixture in the auxiliary combustion chamber 39 can be rapidly burned, whereby a strong jet of flame is injected into the main combustion chamber 36 via the connecting passages 40, 41.

In the embodiment shown in FIG. 2, the spark gap of the spark plug 42 is arranged in the connecting passage 40. This arrangement results in an extremely easy ignition, since the residual exhaust gas remaining around the spark gap of the spark plug 42 and created by the combustion in the preceeding cycle is scavenged by the mixture flowing in the connecting passage 40 at the time of the compression stroke. However, althought the ability of an ignition is reduced to some extent, the spark gap of the spark plug 42 may be located in the auxiliary combustion chamber 39.

As is shown in FIG. 2, jets of flame are injected into the main combustion chamber 36 in the directions shown by the arrows B and C from the connecting passages 40 and 41, respectively. The jet of flame in the direction of arrow B causes the combustion of the mixture existing in the region D enclosed by a broken line in the main combustion chamber 36, while the jet of flame in the direction of arrow C causes the combustion of the mixture existing in the region E enclosed by another broken line in the main combustion chamber 36. According to the present invention, the sizes of the cross-sectional areas of the connecting passages 40 and 41 are set so as to be proportional to the volumes of the mixtures in the corresponding regions D and E burned by the jets of flame injected from the connecting passages 40 and 41, respectively. That is, in the embodiment shown in FIG. 2, the volume of the mixture burned by the jet of flame in the direction of arrow B is larger than that burned by the jet of flame in the direction of the arrow C. Consequently, the connecting passage 40 has a larger cross-sectional area than the connecting passage 41. By setting the cross-sectional areas of the connecting passages 40 and 41 as aforementioned, a strong jet of flame is uniformly injected into the entire space of the main combustion chamber 36. Consequently, even if the air-fuel mixture is not uniformly mixed with the EGR gas in the main combustion chamber 36, the air-fuel mixture is uniformly mixed with the EGR gas due to the jet of flame and, at the same time, an appropriate turbulence is also created by the jet of flame. This results in causing a turbulent burning of the air-fuel mixture in the main combustion chamber 36, whereby the combustion becomes stable and, thus, the amount of harmful HC components produced can be extremely reduced.

In an internal combustion engine with an auxiliary combustion chamber of the type shown in FIG. 2, the temperature of the portion 38a of the auxiliary chamber component 38 becomes considerably high. However, in the present invention, since the auxiliary chamber component 38 is press-fitted into the recess 37 of the cylinder head 34, the thermal resistance between the outer wall of the auxiliary chamber component 38 and the cylinder head 34 is minimized. Consequently, the heat in the portion 38a of the auxiliary chamber component 38 is efficiently transferred to the cylinder head 34, and, thus, there is no danger that the portion 38a of the auxiliary chamber component 38 will be melted away.

Figure 4A:
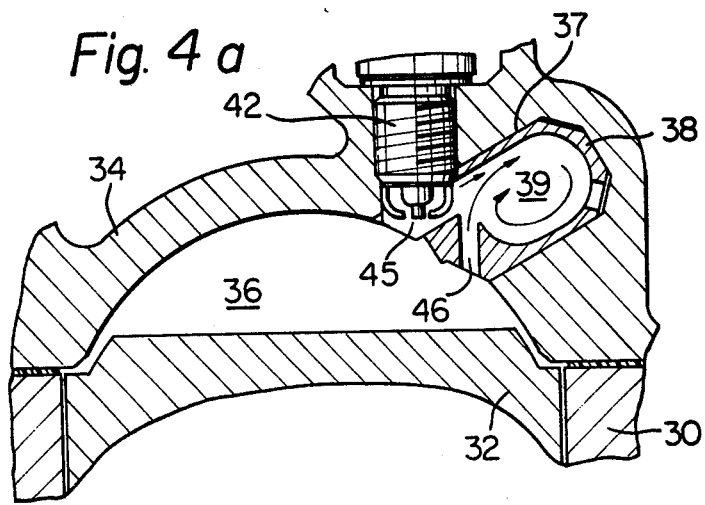
FIG. 4a is a cross-sectional side view of another embodiment.
Figure 4B:
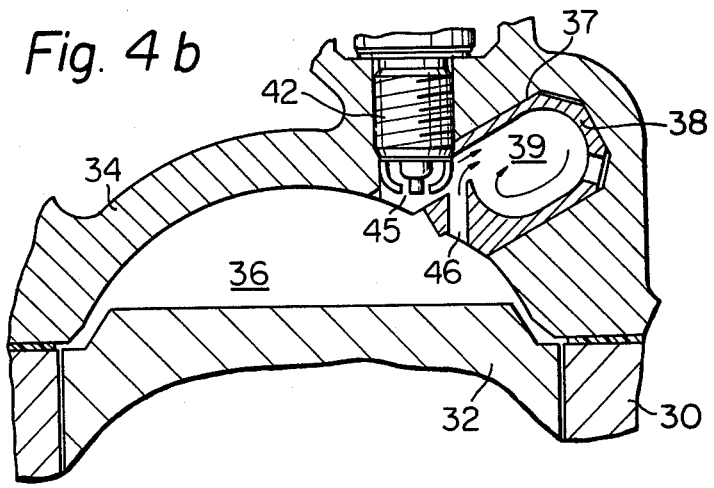
FIG. 4b is a cross-sectional side view of a further embodiment.

FIGS. 4a through 8 show other embodiments of the present invention. In FIGS. 4a through 8, similar components are indicated with the same reference numerals as in FIG. 2. Referring to FIG. 4a, a connecting passage 45 is arranged so that the mixture introduced into the auxiliary combustion chamber 39 flows along the inner wall of the auxiliary combustion chamber 39 on the spark plug side with respect to the central axis of the auxiliary chamber component 38. A connecting passage 46 opens to the auxiliary combustion chamber 39 towards the inner wall of the auxiliary combustion chamber 39 on the spark plug side with respect to the central axis of the auxiliary chamber component 38. Since the volume of the mixture in the main combustion chamber 36 burned by the jet of flame injected from the connecting passage 45 is larger than that burned by the jet of flame injected from the connecting passage 46, the connecting passage 45 has a larger cross-sectional area than the connecting passage 46. In an embodiment shown in FIG. 4a, the connecting passage 46 directly opens to the auxiliary combustion chamber 39. However, as shown in FIG. 4b, even if the connecting passage 46 is arranged so as to open to the connecting passage 45 on the auxiliary combustion chamber side with respect to the spark gap of the spark plug 42, there can be obtained the same effect as that in FIG. 4a.

Figure 5:
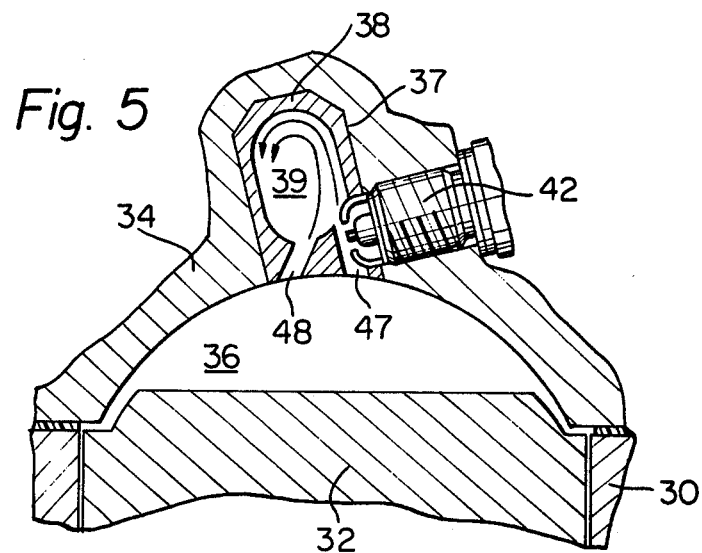
FIG. 5 is a cross-sectional side view of a still further embodiment.

Referring to FIG. 5, connecting passages 47 and 48 are arranged so that the volume of the mixture in the main combustion chamber 36 burned by the jet of flame injected from the connecting passage 47 is equal to that burned by the jet of flame injected from the connecting passage 48. Consequently, the connecting passage 47 has the same cross-sectional area as that of the connecting passage 48.

Figure 6:
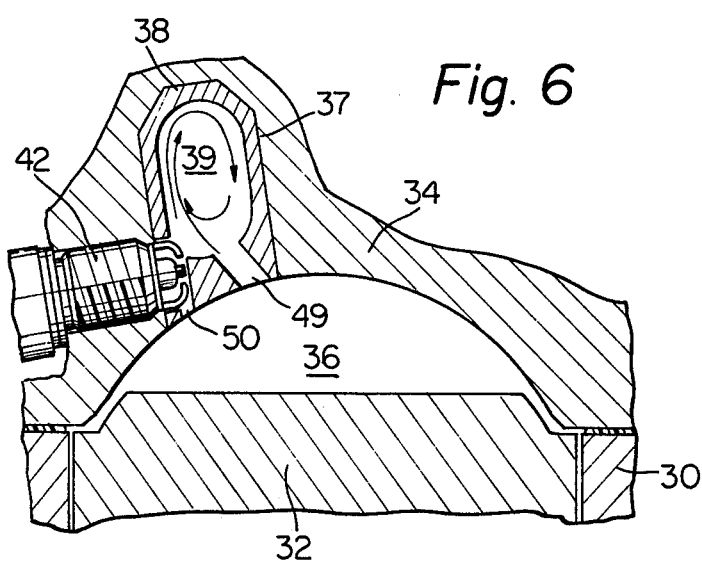
FIG. 6 is a cross-sectional side view of a still further embodiment.

Referring to FIG. 6, since the volume of the mixture in the main combustion chamber 36 burned by the jet of flame injected from connecting passage 49 is larger than that burned by the jet of flame injected from connecting passage 50, the connecting passage 49 has a larger cross-sectional area than the connecting passage 50. In this embodiment, the spark gap of the spark plug 42 is located in the connecting passage 50. In this case, since the jet of flame injected from the connecting passage 50 is weaker than that injected from the connecting passage 49, there is no danger that the electrode of the spark plug 42 will be overheated due to the jet of flame. In addition, since the connecting passage 50 has a relatively small cross-sectional area, the mixture flowing in the connecting passage 50 is subjected to a relatively large drag. Thus, even if the engine is operating at a high speed, the velocity of the mixture entering into the auxiliary combustion chamber 39 via the connecting passage 50 at the time of the compression stroke is lower than that flowing in the connecting passage 49 due to the above-mentioned drag. Actually, if the velocity of the mixture flowing around the spark gap of the spark plug is excessively high when the engine is operating at high speed, the spark caused by the spark plug is extinguished due to the mixture stream. However, in this embodiment, since the velocity of the mixture flowing in the connecting passage 50 is a relatively low, as aforementioned, easy ignition of the mixture ensured.

Figure 7:
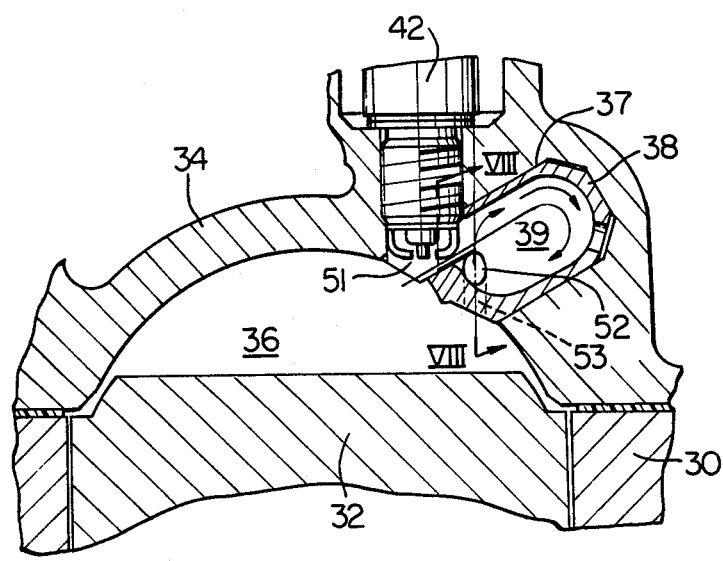
FIG. 7 is a cross-sectional side view of a still further embodiment.
Figure 8:
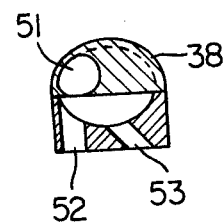
FIG. 8 is a cross-sectional view taken along the line VIII—VIII in FIG. 7.

Referring to FIGS. 7 and 8, the auxiliary chamber component 38 is provided with three connecting passages 51, 52 and 53. The connecting passages 52 and 53 are arranged so that each of the mixtures introduced into the auxiliary combustion chamber 39 form the connecting passages 52 and 53, respectively, strengthens the swirl motion of the mixture created by the mixture introduced into the auxiliary combustion chamber 39 from the connecting passages 51. In this embodiment, the connecting passages 51, 52 and 53 have cross-sectional areas proportional to the volumes of the mixture in the main combustion chamber 36 burned by the jets of flame injected from the connecting passages 51, 52 and 53, respectively.

The auxiliary chamber component 38 may be provided with more than three connecting passages. However, in order to obtain an effective jet of flame, the range of $V_p$ (the volume of the auxiliary combustion chamber)/$F_t$(the total cross-sectional area of the connecting passages) is restricted. That is, if the value of $V_p/F_t$ is excessively small, the jet of flame becomes weak, while, if the value of $V_p/F_t$ is excessively large, the velocity of the jet of flame becomes excessively high, whereby the torch is extinguished. According to an experiment conducted by the inventors, it was proven that, in order to obtain an effective jet of flame, the value of $V_p/F_t$ must be within the range of 3 cm through 20 cm.

Consequently, if the number of the connecting passages is increased, the cross-sectional area of some of the connecting passages must be reduced, because the total cross-sectional area of the connecting passages is restricted as aforementioned. However, if the cross-sectional area of the connecting passage is excessively reduced, the flame injected into the main combustion chamber 36 from the auxiliary combustion chamber 39 is cooled in the connecting passage, and; in addition, if the diameter of the connecting passage is smaller than the quench distance, there is a danger that the jet of flame will be extinguished. Furthermore, if the cross-sectional area of the connecting passage is excessively reduced, there is a danger that the connecting passage will be choked by soot deposited in the connecting passage, or that the cross-sectional area of the connecting passage will be narrowed due to the seat. According to an experiment conducted by the inventors, it was proven that, in order to avoid the above dangers, the cross-sectional area of the connecting passage must be more than 3.14 mm³. Consequently, only when this restriction is taken consideration, can the number of the connecting passages be decided.

As a mixture used for an internal combustion engine with an axuiliary combustion chamber according to the present invention, an air-fuel mixture of an approximately stoichiometric air-fuel ratio is used. However, in order to simultaneously reduce an amount of harmful HC, CO and $NO_x$ components in the exhaust gas, a lean air-fuel mixture of an air-fuel ratio of 18 through 20:1 can be used. In either case, in an internal combustion engine according to the present invention, a large amount of the EGR gas, of more than ten percent relative to the mixture introduced into the cylinder of the engine, can be recirculated.

As is hereinbefore described, according to the present invention, by generating a strong swirl in the auxiliary combustion chamber, an air-fuel mixture containing a large amount of the EGR gas can be rapidly burned in the auxiliary combustion chamber, thus obtaining a strong jet of flamge. In addition, by providing a plurality of connecting passages, and by setting the cross-sectional areas of the connecting passages so as to be proportional to the volumes of the mixture in the main combustion chamber burned by the corresponding jets of flame injected from the connecting passages, the jets of flame can be uniformly distributed and injected over the entire space of the main combustion chamber. The strong jets of flame thus injected uniformly mix the EGR gas with the air-fuel mixture in the main combustion chamber and generate an appropriate turbulence of the mixture in the main combustion chamber, thereby obtaining a stable combustion and minimizing the amount of harmful HC components produced in the exhaust gas. Furthermore, an air-fuel mixture of an approximately staichiometric air-fuel ratio, or a lean air-fuel mixture can be used, thereby reducing fuel consumption compared with the case where a rich air-fuel mixture is used.

While the invention has been described by reference to specific embodiments chosen for purposes of illustration, it should be apparent that numerous changes could be made within the spirit and scope of the inventive concepts disclosed and, accordingly, it is intended that the invention be limited only by the language of the following claims.

What is claimed is:

1. An internal combustion engine having an intake system, an exhaust system, and an exhaust gas recirculating system for recirculating the exhaust gas from the exhaust system into the intake system, comprising:
   a cylinder comprising a cylinder block and a cylinder head;
   a piston reciprocally movable in said cylinder;
   a main combustion chamber formed in said cylinder between said cylinder head and said piston, said cylinder head having therein a bore which has an inner wall defining an auxiliary combustion chamber;
   a first connecting passage communicating said auxiliary combustion chamber with said main combustion chamber and opening into said auxiliary combustion chamber tangentially to the inner wall of said auxiliary combustion chamber for generating a swirl motion of a combustible mixture containing the recirculated exhaust gas therein in said auxiliary combustion chamber;
   a second connecting passage communicating said auxiliary combustion chamber with said main combustion chamber and opening into the auxiliary combustion chamber towards said inner wall of the auxiliary combustion chamber to which said first connecting passage opens tangentially for strengthening said swirl motion, and;
   a spark plug having a spark gap located in an auxiliary chamber region consisting of said auxiliary combustion chamber and said connecting passages.

2. An internal combustion engine as claimed in claim 1, wherein the cross-sectional area of each of said first and said second connecting passages is proportional to the respective volume of the mixture in the main combustion chamber burned by the torches injected from said first connecting passage and said second connecting passage, respectively.

3. An internal combustion engine as claimed in claim 2, wherein the opening of said first connecting passage is directed to the peripheral portion in the main combustion chamber, while the opening of said second connecting passage is directed to the central portion in the main combustion chamber, the cross-sectional area of said first connecting passage being smaller than that of said second connecting passage.

4. An internal combustion engine as claimed in claim 3, wherein the spark gap of the spark plug is located in said first connecting passage.

5. An internal combustion engine as claimed in calim 3, wherein the spark gap of the spark plug is located in said second connecting passage.

6. An internal combustion engine as claimed in claim 5, wherein a dam is formed on the inner wall of the auxiliary combustion chamber near the spark gap of the spark plug.

7. An internal combustion engine as claimed in claim 2, wherein the opening of said first connecting passage is directed to the central portion in the main combustion chamber, while the opening of said second connecting passage is directed to the peripheral portion in the main combustion chamber, the cross-sectional area of said first connecting passage being larger than those of said second connecting passage.

8. An internal combustion engine as claimed in claim 7, wherein the spark gap of the spark plug is located in said first connecting passage.

9. An internal combustion engine as claimed in claim 7, wherein the spark gap of the spark plug is located in said second connecting passage.

10. An internal combustion engine as claimed in claim 2, wherein the cross-sectional area of said first connecting passage is equal to those of said second connecting passage.

11. An internal combustion engine as claimed in claim 10, wherein the spark gap of the spark plug is located in said first connecting passage.

12. An internal combustion engine as claimed in claim 10, wherein the spark gap of the spark plug is located in said second connecting passage.

13. An internal combustion engine as claimed in claim 1, wherein a third connecting passage is further provided for communicating said auxiliary combustion chamber with said main combustion chamber, said third connecting passage opening into the auxiliary combustion chamber towards the inner wall of the auxiliary combustion chamber to which said first connecting passage opens tangentially.

14. An internal cobmustion engine as claimed in claim 13, wherein the spark gap of the spark plug is located in said first connecting passage.

15. An internal combustion engine as claimed in claim 13, wherein the spark gap of the spark plug is located in said second connecting passage.

16. An internal combustion engine as claimed in claim 1, wherein a plurality of connecting passages are further provided for communicating said auxiliary combustion chamber with said main combustion chamber, said plurality of the connecting passages opening into the auxiliary combustion chamber towards the inner wall of the auxiliary combustion chamber to which said first connecting passage opens tangentially.

17. An internal combustion engine as claimed in claim 1, wherein the value of the volume of the auxiliary combustion chamber/the total cross-sectional area of the connecting passages is within the range of 3 cm through 20 cm.

18. An internal combustion engine as claimed in claim 17, wherein the cross-sectional area of the connecting passage is larger than 3.14 mm$^3$.

19. An internal combustion engine as claimed in claim 1, wherein said auxiliary combustion chamber is formed in an auxiliary chamber component press-fitted into the cylinder head.

* * * * *